United States Patent
Chen et al.

(10) Patent No.: US 9,811,065 B2
(45) Date of Patent: Nov. 7, 2017

(54) HUMAN DETECTION SYSTEM AND HUMAN DETECTION METHOD

(71) Applicant: DELTA ELECTRONICS, INC., Taoyuan County (TW)

(72) Inventors: Meng-Seng Chen, Taoyuan County (TW); Hsin-Yu Chen, Taoyuan-County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 266 days.

(21) Appl. No.: 14/734,388

(22) Filed: Jun. 9, 2015

(65) Prior Publication Data
US 2016/0161958 A1    Jun. 9, 2016

(30) Foreign Application Priority Data
Dec. 4, 2014    (TW) .............................. 103142097 A

(51) Int. Cl.
G05B 15/02    (2006.01)

(52) U.S. Cl.
CPC ...... *G05B 15/02* (2013.01); *G05B 2219/2642* (2013.01)

(58) Field of Classification Search
CPC combination set(s) only.
See application file for complete search history.

(56) References Cited

U.S. PATENT DOCUMENTS

| 6,081,619 | A | * | 6/2000 | Hashimoto | ........ G06K 9/00335 250/342 |
| 2004/0005086 | A1 | * | 1/2004 | Wolff | ................. G06K 9/00228 382/118 |
| 2006/0034537 | A1 | * | 2/2006 | Masaki | .............. G06K 9/00362 382/254 |

(Continued)

FOREIGN PATENT DOCUMENTS

| CN | 202885427 U | 4/2013 |
| JP | H02312186 | 12/1990 |

(Continued)

OTHER PUBLICATIONS

Office Action dated Oct. 18, 2016 from corresponding application No. JP 2015-200467.

(Continued)

*Primary Examiner* — Tsung-Yin Tsai
(74) *Attorney, Agent, or Firm* — Hauptman Ham, LLP

(57) ABSTRACT

A human detection system includes a thermal sensor and an indoor apparatus. The thermal sensor captures a thermal image of an indoor space. The human detection system includes a human entering detection mode, a first human exiting detection mode corresponding to a state of turning off the indoor apparatus and a second human exiting detection mode corresponding to a state of turning on the indoor apparatus, wherein the human detection system executes a human entering detection procedure according to the thermal image under the first human entering detection mode, and executes a human exiting detection procedure according to the thermal image under the first human exiting detection mode or the second human exiting detection mode.

22 Claims, 10 Drawing Sheets

(56) References Cited

U.S. PATENT DOCUMENTS

| | | | |
|---|---|---|---|
| 2008/0159591 A1* | 7/2008 | Ruedin | G06K 9/6289 382/103 |
| 2012/0274755 A1* | 11/2012 | Sinha | G06K 9/00369 348/77 |
| 2013/0073093 A1* | 3/2013 | Songkakul | G05B 15/02 700/276 |
| 2013/0147917 A1 | 6/2013 | Lee et al. | |
| 2013/0321637 A1* | 12/2013 | Frank | H04N 5/33 348/152 |
| 2015/0370272 A1* | 12/2015 | Reddy | G05B 15/02 700/278 |

FOREIGN PATENT DOCUMENTS

| | | |
|---|---|---|
| JP | H0814615 | 6/1996 |
| JP | 2000223282 | 8/2000 |
| JP | 2003006642 | 1/2003 |
| JP | 2005222359 | 8/2005 |
| JP | 2010211995 | 9/2010 |
| JP | 2012194121 | 10/2012 |
| TW | 200928240 | 7/2009 |
| TW | 201324446 | 6/2013 |
| TW | 201326765 | 7/2013 |

OTHER PUBLICATIONS

Office Action dated Jul. 4, 2017 from corresponding application No. JP 2015-200467.

Office Action dated Apr. 7, 2016 from corresponding application No. TW 103142097.

Office Action dated Aug. 24, 2017 from corresponding application No. CN 201410734162.8.

* cited by examiner

HUMAN DETECTION SYSTEM AND HUMAN DETECTION METHOD

BACKGROUND OF THE INVENTION

1. Technical Field

The present disclosure generally relates to a human detection, and more particularly to a human detection system and method.

2. Description of Related Art

In general, indoor apparatuses, such an electric light, an air conditioner, a fan, or a projector, placed in an indoor space are manually operated to turn on or turn off by users. For example, it is assumed that the indoor space is a meeting room and the indoor apparatuses are electric lights and an air conditioner. The user has to manually turn on the electric lights and the air conditioner after entering the meeting room; and the user has to manually turn off the electric lights and the air conditioner before exiting the meeting room thereby avoiding waste of energy resources.

However, it is inconvenient to manually operate the indoor apparatuses by the user, and occur energy waste once the user forgets to manually turn off the indoor apparatus. Hence, a human detection system is developed on the market.

For the conventional human detection system, the mobile sensors, such as the passive infrared sensors (PIRs) are usually used to detect whether any one is in the indoor space by detecting moving objects. If the mobile sensor detects the moving objects, the conventional human detection system judges that at least one person stays in the indoor space and automatically turns on the indoor apparatus. If the mobile sensor does not detect the moving objects, the conventional human detection system judges that no one stays in the indoor space and automatically turns off the indoor apparatus.

However, if there is at least one person in the indoor space but the person does not move, the conventional human detection system would judge that no one stays in the indoor space and automatically turn off the indoor apparatus. Hence, it is inconvenient for the user in the indoor space to operate the indoor apparatus.

In addition, the conventional human detection system only has two modes: one is "someone in the space" and the other is "no one in the space". Under the former mode, the indoor apparatus is automatically turned on; and the indoor apparatus is automatically turned off under the later mode.

For example, the user manually turns off the electric light in order to make a slide presentation. However, the conventional human detection system would automatically turn on the electric light once judging that someone moves in the indoor space during the slide presentation. Hence, it causes the uncoordinated operations between the user and the human detection system.

Accordingly, it is desirable to provide a human detection system to overcome the above-mentioned problems.

SUMMARY OF THE INVENTION

An object of the present disclosure is to provide a human detection system and a human detection method to implement human detections by using a thermal image.

Another object of the present disclosure is to provide a human detection system and a human detection method to implement switching detection modes according to the states of the indoor apparatus.

Further another object of the present disclosure is to provide a human detection system and a human detection method to respectively implement the human entering detection and the human exiting detection.

In order to achieve the above-mentioned objects, the present invention discloses a human detection system applied to an indoor space. The human detection system includes a thermal sensor, an indoor apparatus, and a control apparatus. The thermal sensor continuously captures a thermal image of the indoor space. The control apparatus is connected to the thermal sensor and the indoor apparatus. The control apparatus enters a first detection mode and executes a human entering detection procedure when the indoor apparatus is turned off and all people exit the indoor space. The control apparatus enters a second detection mode and executes a human exiting detection procedure when the indoor apparatus is turned off and at least one person enters the indoor space. The control apparatus enters a third detection mode and executes the human exiting detection procedure when the indoor apparatus is turned on and at least one person enters the indoor space. The control apparatus detects whether at least one person enters the indoor space according to the thermal image under the human entering detection procedure, and detects whether all people exit the indoor space according to the thermal image under the human exiting detection procedure.

In order to achieve the above-mentioned objects, the present invention further discloses a human detection system applied to an indoor space. The human detection system includes an indoor apparatus, a control apparatus, and a human detector. The control apparatus is connected to the indoor apparatus to control the indoor apparatus according to a control signal and transmit a state signal of the indoor apparatus. The human detector is connected to the control apparatus. The human detector includes a thermal sensor, a transmission unit, and a microcontroller. The thermal sensor continuously captures a thermal image of the indoor space. The transmission unit transmits the control signal to the control apparatus and receives the state signal from the control apparatus. The microcontroller unit is connected to the thermal sensor and the transmission unit.

The control apparatus controls the indoor apparatus according to the control signal, and the indoor apparatus transmits the state signal representing the current state thereof to the control apparatus. The microcontroller unit enters a first detection mode and executes a human entering detection procedure when the indoor apparatus is turned off and all people exit the indoor space. The microcontroller unit enters a second detection mode and executes a human exiting detection procedure when the indoor is turned off and at least one person enters the indoor space. The microcontroller unit enters a third detection mode and executes the human exiting detection procedure when the indoor apparatus is turned on and at least one person enters the indoor space. The microcontroller detects whether at least one person enters the indoor space and generates the corresponding control signal according to the thermal image under the human entering detection procedure. The microcontroller detects whether all people exit the indoor space and generates the corresponding control signal according to the thermal image under the human exiting detection procedure.

In order to achieve the above-mentioned objects, the present invention further discloses a human detection method applied to a human detection system. The human detection system includes a thermal sensor, a control apparatus, and an indoor apparatus. The thermal sensor continuously captures a thermal image of an indoor space. The method includes steps as follows. (a) entering a first detection mode to detect whether at least one person enters the indoor space according to the thermal image; (b) detecting whether the indoor apparatus is turned on when at least one person enters the indoor space and entering a second detection mode, and detecting whether all people exit the indoor space according to the thermal image; (c) executing the step (a) when all people exit the indoor space in the step (b); (d) entering a third detection mode to detect whether the indoor apparatus is turned off and detect whether all people exit the indoor space according to thermal image when detecting that the indoor apparatus is turned on in the step (b); (e) executing the step (b) when the indoor apparatus is turned off in the step (d); (f) turning off the indoor apparatus when all people exit the indoor space in the step (d); and (g) judging whether the human detection system is disabled in the step (f), and executing the step (a) when the human detection system is not disabled.

The efficacy of the present disclosure is to avoid misjudgment of human exiting the indoor space when the person does not move to exit the indoor space.

In addition, the second detection mode (the indoor apparatus is turned off) and the third detection mode (the indoor apparatus is turned on) are switched according to the states of the indoor apparatus to avoid causing the uncoordinated conditions between the detection system and the user after the user manually turns on or turns off the indoor apparatus.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
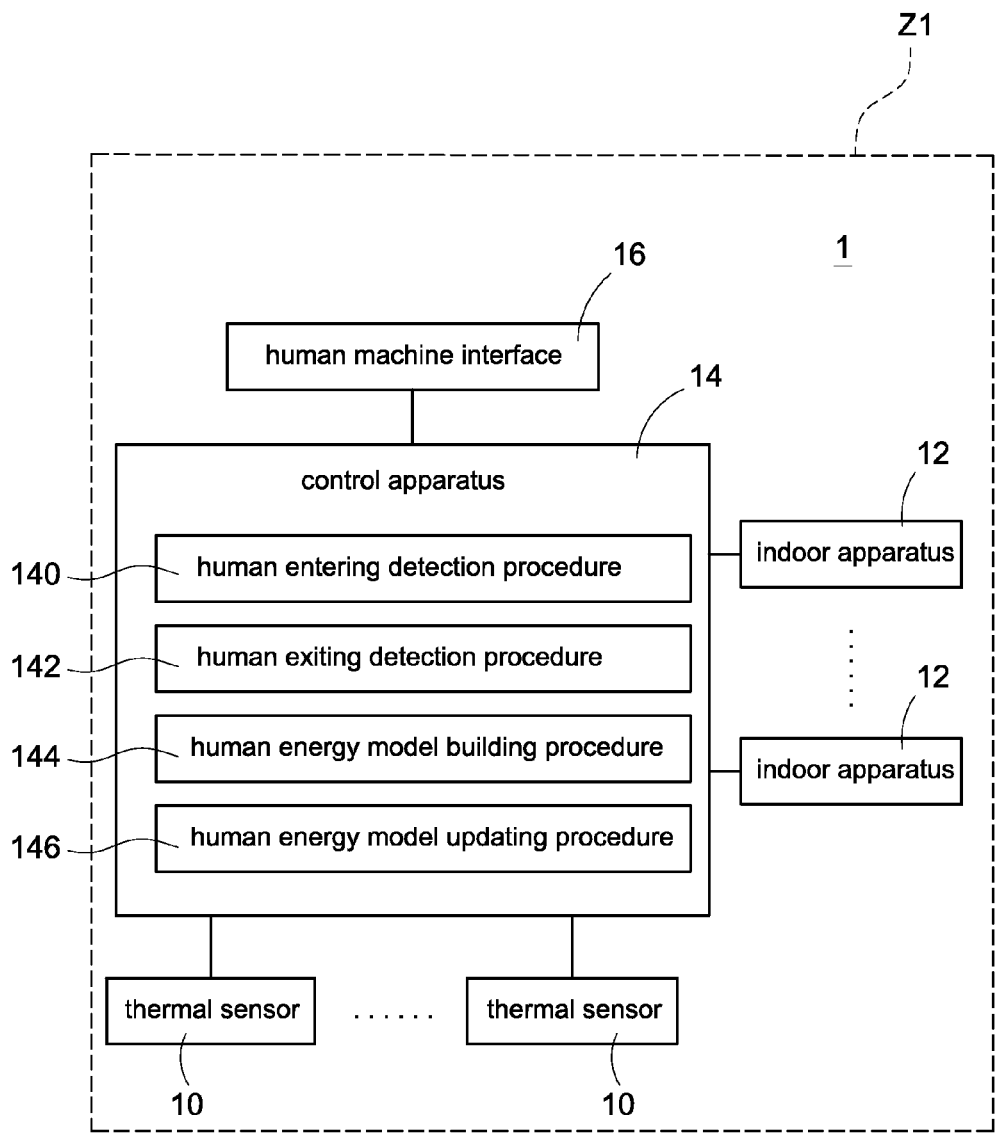
FIG. 1 is a structure block diagram of a human detection system according to a first embodiment of the present disclosure.

Reference will now be made to the drawing figures to describe the present disclosure in detail.

Reference is made to FIG. 1 which is a structure block diagram of a human detection system according to a first embodiment of the present disclosure. The human detection system 1 is applied to an indoor space Z1, and the human detection system 1 mainly includes at least one thermal sensor 10, at least one indoor apparatus 12, and a control apparatus 14.

The thermal sensor 10 is used to continuously capture a thermal image of the indoor space Z1. More specifically, the thermal sensor 10 can be a thermistor temperature sensor (not shown) for receiving thermal radiation, converting the received thermal radiation into an electric signal according to the thermoelectric effect or photoelectric effect, and converting the electric signal into the thermal image. In addition, the thermal sensor 10 can be preferably an infrared thermal sensor; and the thermal image can be a gray-level image and different gray levels of the gray-level image are corresponding to different temperatures. In another embodiment, the thermal image can be a color image and different color levels are corresponding to different temperatures. However, these examples are for demonstration and not for limitation of the present disclosure.

The indoor apparatus 12 is connected to the control apparatus 14 and controlled by the control apparatus 14. More specifically, the indoor apparatus 12 is turned on or turned off by a control signal generated from the control apparatus 14, and the indoor apparatus 12 transmits a state signal representing the current state thereof to the control apparatus 14. The indoor apparatus 12 can be an electric light, an air conditioner, a fan, a projector, and so on.

In this example, the single indoor apparatus 12 is exemplified for further demonstration, but not limited. In other words, the number and type of the indoor apparatus 12 can be arbitrarily changed according to the actual demands. For example, the control apparatus 14 can simultaneously connect to different types of indoor apparatuses 12.

Figure 3:
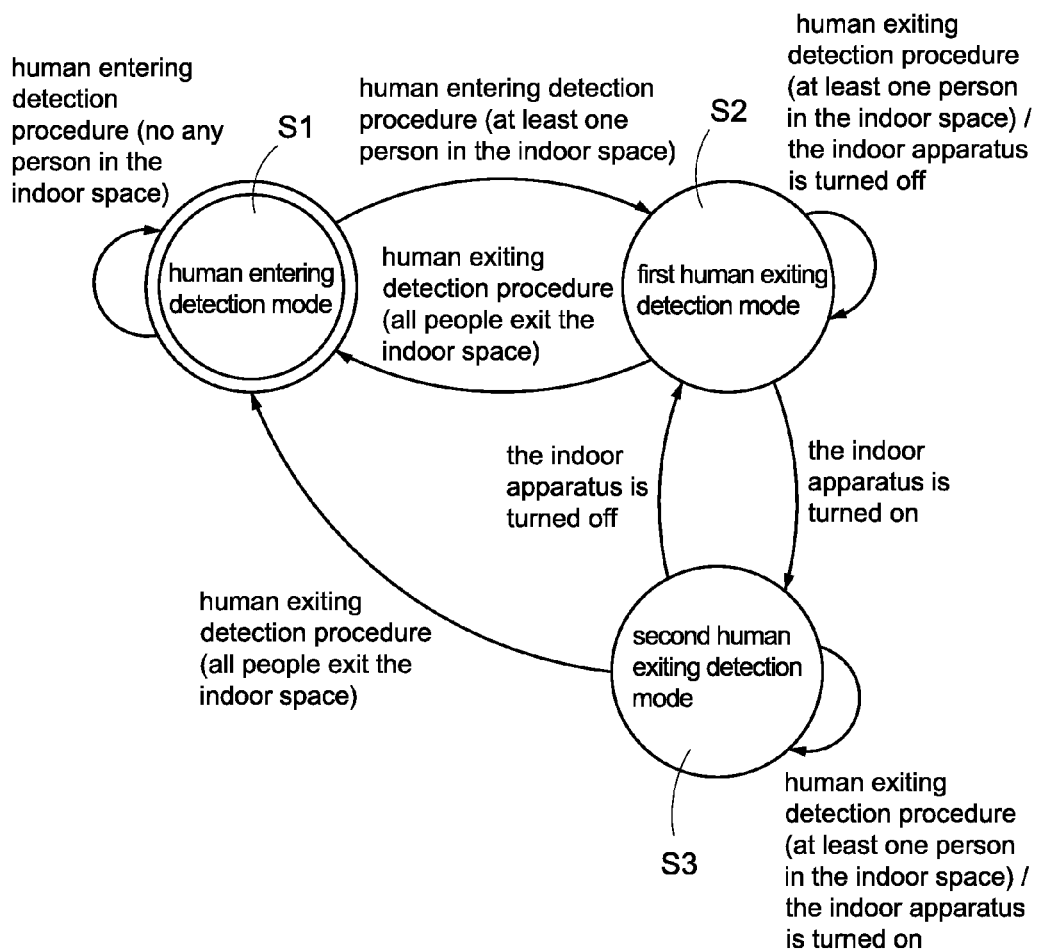
FIG. 3 is a state diagram of the detection mode according to a first embodiment of the present disclosure.
Figure 4:
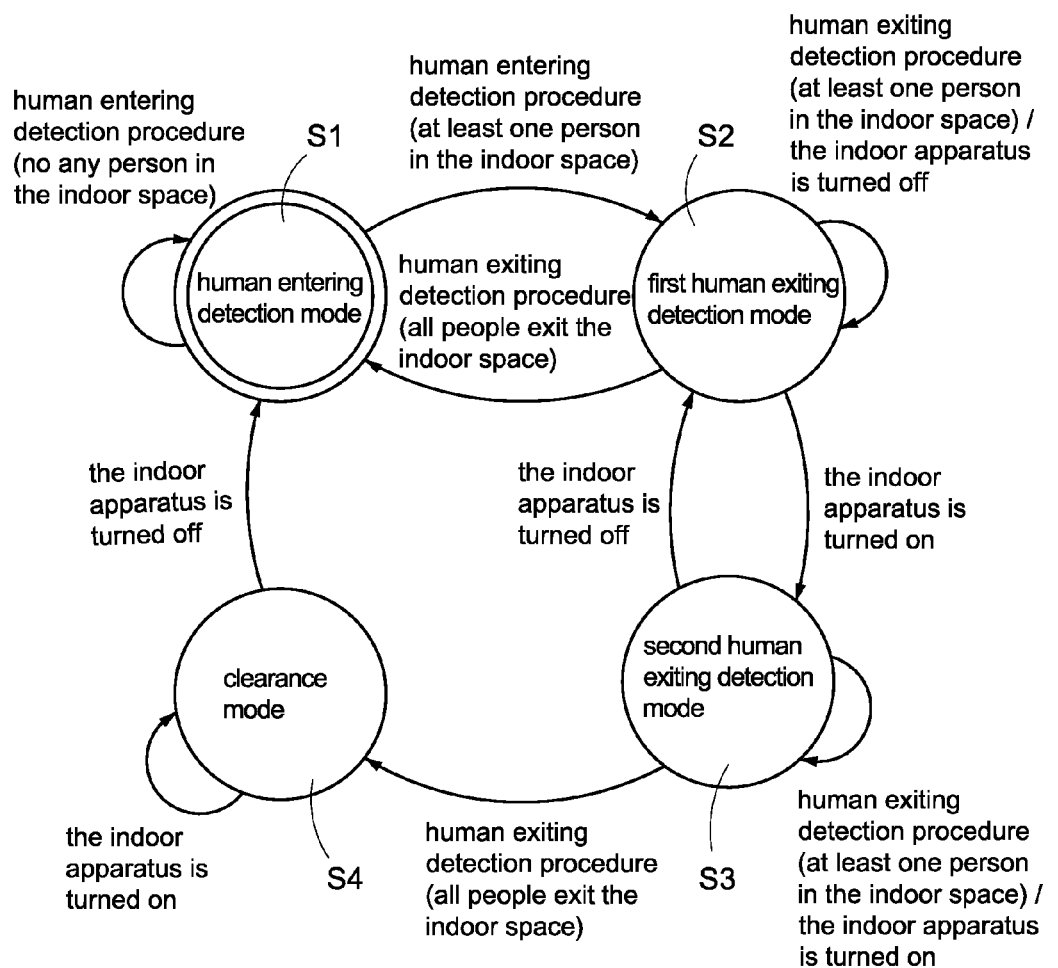
FIG. 4 is a state diagram of the detection mode according to a second embodiment of the present disclosure.

The control apparatus 14 is connected to the indoor apparatus 12 to control the indoor apparatus 12. The control apparatus 14 at least provides a human entering detection mode S1, a first human exiting detection mode S2, and a second human exiting detection mode S3 as shown in FIG. 3 and FIG. 4. Also, the detection modes S1-S3 can be switched to each other to execute different control operations corresponding to the different detection modes. The control apparatus 14 is further connected to the thermal sensor 10 to acquire the thermal image through the thermal sensor 10, and executes human entering and exiting detections in the indoor space Z1 according to the thermal image.

More specifically, the control apparatus 14 enters the human entering detection mode S1 and executes a human entering detection procedure 140 when the indoor apparatus 12 is turned off and all people exit the indoor space Z1. Also, the control apparatus 14 enters the first human exiting detection mode S2 and executes a human exiting detection procedure 142 when the indoor apparatus 12 is turned off and at least one person enters the indoor space Z1. In addition, the control apparatus 14 enters the second human exiting detection mode S3 and executes the human exiting detection procedure 142 when the indoor apparatus 12 is turned on and at least one person enters the indoor space Z1. In particular, the human entering detection procedure 140 detects whether the person enters the indoor space Z1 according to the current thermal image. Also, the human exiting detection procedure 142 detects whether all people exit the indoor space Z1 according to the current thermal image.

Preferably, the human entering detection procedure 140 detects whether the person enters the indoor space Z1 according to the complexity of the current thermal image. The control apparatus 14 executes a human energy model building procedure 144 to build a human energy model when the human entering detection procedure 140 detects the person enters the indoor space Z1. The human exiting detection procedure 142 detects whether all people exit the indoor space Z1 according to the complexity of the current thermal image and the human energy model (to detailed later). The control apparatus 14 executes a human energy model updating procedure 146 to update the human energy model when the human exiting detection procedure 142 detects not all people exit the indoor space Z1.

In this embodiment, the human energy model is built according to the thermal image and the human exiting detection is executed according to the human energy model to avoid misjudgment of the human detection due to the non-human heat source.

For example, it is assumed that the indoor apparatuses, such as the projector or the computer placed in the indoor space Z1 are still turned on when all people exit the indoor space Z1. Because the temperature characteristic of the indoor apparatus is different from the human body temperature, it is easy to judge whether the heat source in the indoor space is the human heat source by analyzing the thermal image. If the thermal image does not exist the human heat source, it can be judged that all people exit the indoor space Z1.

Preferably, the control apparatus 14 can actively turn on the indoor apparatus 12 when the control apparatus 14 is from the human entering detection mode S1 to the first human exiting detection mode S2, and actively enter the second human exiting detection mode S3 after the indoor apparatus 12 is turned on. Therefore, the human detection system 1 can automatically turn on the indoor apparatus 12 when at least one person enters the indoor space Z1.

In another embodiment, the control apparatus 14 can enter a clearance mode (as a clearance mode S4 shown in FIG. 4) when the indoor apparatus 12 is turned on and all people exit the indoor space Z1. In the clearance mode S4, the control apparatus 14 can continuously detect the state of the indoor apparatus 12. The control apparatus 14 actively enters the human entering detection mode S1 when detecting that the indoor apparatus 12 is turned off (it is assumed that the control apparatus 14 actively turns off the indoor apparatus 12 when all people exit the indoor space); otherwise the operation mode is not switched (changed) to keep detecting the state of the indoor apparatus 12.

In another embodiment of the present disclosure, the human detection system 1 further includes a human machine interface 16 which is connected to the control apparatus 14. The human machine interface 16 can be operated to trigger the control signal to control the control apparatus 14, thus controlling the indoor apparatus 12 to be turned on or turned off according to the control signal by the control apparatus 14.

Figure 2:
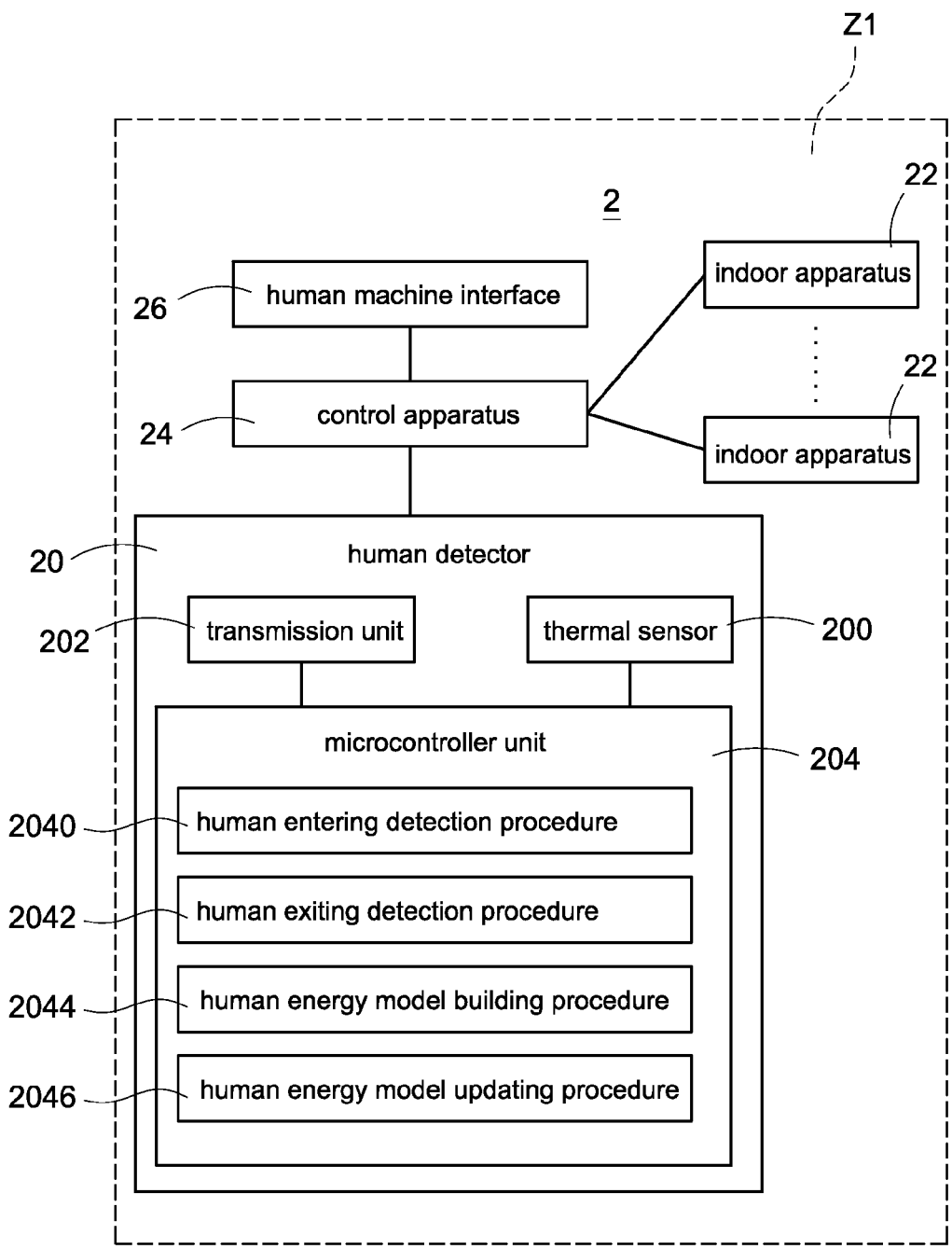
FIG. 2 is a structure block diagram of a human detection system according to a second embodiment of the present disclosure.

Reference is made to FIG. 2 which is a structure block diagram of a human detection system according to a second embodiment of the present disclosure. The second embodiment discloses another human detection system 2. The human detection system 2 mainly includes a human detector 20, at least one indoor apparatus 22, a control apparatus 24, and a human machine interface 26. Because the indoor apparatus 22 and the human machine interface 26 are corresponding to the indoor apparatus 12 and the human machine interface 26, the detail descriptions of the indoor apparatus 22 and the human machine interface 26 are omitted here for conciseness.

The major difference between the human detection system 1 in the first embodiment and the human detection system 2 in this embodiment is that the latter provides a human detector 20 to execute the human entering detection and the human exiting detection. The human detector 20 generates a control signal according to the detected results and transmits the control signal to the control apparatus 24. The control apparatus 24 controls the indoor apparatus 22 according to the control signal, and further transmits a state signal of the indoor apparatus 22 to the human detector 20.

As shown in FIG. 2, the control apparatus 24 is connected to the human detector 20, the indoor apparatus 22, and the human machine interface 26. The human detector 20 includes a thermal sensor 200, a transmission unit 202, and a microcontroller unit (MCU) 204. The thermal sensor 200 is used to continuously capture a thermal image of the indoor space Z1. The transmission unit 202 is used to transmit the control signal to the control apparatus 24, and receive the state signal of the indoor apparatus 22 from the control apparatus 24. In particular, the state signal at least has an operation state of the indoor apparatus 22.

More specifically, the MCU 204 at least has the human entering detection mode S1, the first human exiting detection mode S2, and the second human exiting detection mode S3. Also, the detection modes S1-S3 can be switched to each other to execute different control operations corresponding to the different detection modes. The MCU 204 acquires the thermal image through the thermal sensor 200 and executes the human entering/exiting detections to the indoor space Z1 according to the thermal image.

More specifically, the MCU 204 enters the human entering detection mode S1 and executes a human entering detection procedure 2040 when the indoor apparatus 12 is turned off and all people exit the indoor space Z1. Also, the MCU 204 enters the first human exiting detection mode S2 and executes a human exiting detection procedure 2042 when the indoor apparatus 12 is turned off and at least one person enters the indoor space Z1. In addition, the MCU 204 enters the second human exiting detection mode S3 and executes the human exiting detection procedure 2042 when the indoor apparatus 12 is turned on and at least one person enters the indoor space Z1. Because the function and efficacy of the human entering detection procedure 2040 is identical to that of the above-mentioned human entering detection procedure 140 and the function and efficacy of the human exiting detection procedure 2042 is identical to that of the above-mentioned human exiting detection procedure 142, the detail description is omitted here for conciseness.

Preferably, the MCU 204 actively transmits the control signal to the control apparatus 24 through the transmission unit 202 when switching the human entering detection mode S1 to the first human exiting detection mode S2. As a result, the control apparatus 24 actively turns on the indoor apparatus 22 according to the control signal and the MCU 204 actively enters the second human exiting detection mode S3 after the indoor apparatus 22 is turned on. Accordingly, the human detection system 2 can automatically turn on the indoor apparatus 22 when at least one person enters the indoor space Z1.

In another embodiment of the present disclosure, the clearance mode S4 is actively switched by the MCU 204 when the indoor apparatus 22 is turned on and all people exit the indoor space Z1. In the clearance mode S4, the MCU 204 continuously detects the state of the indoor apparatus 22 through the control apparatus 24. If the MCU 204 detects that the indoor apparatus 12 is turned off (it is assumed that the MCU 204 actively transmits the control signal to the control apparatus 24 by the transmission unit 202 when all people exit the indoor space, and the control apparatus 24 turns off the indoor apparatus 22 according to the control signal), the human entering detection mode S1 is actively switched by the MCU 204; otherwise the operation mode is not switched (changed) to keep detecting the state of the indoor apparatus 12.

Reference is made to FIG. 3 which is a state diagram of the detection mode according to a first embodiment of the present disclosure. FIG. 3 expresses switching the detection modes S1-S3 to each other by the control apparatus 14 or the microcontroller unit 204. For convenience, the control apparatus 14 is exemplified for further demonstration.

As shown in FIG. 3, the initial mode of the control apparatus 14 is the human entering detection mode S1. In this mode, the indoor apparatus 12 is turned off and all people exit the indoor space Z1. In addition, the control apparatus 14 continuously executes the human entering detection procedure 140 in the human entering detection mode S1. If the control apparatus 14 detects that at least one person enters the indoor space Z1, the control apparatus 14 enters the first human exiting detection mode S2; otherwise the operation mode is not switched (changed).

In the first human exiting detection mode S2, the indoor apparatus 12 is turned off and the person enters the indoor space Z1. The control apparatus 14 continuously detects the state of the indoor apparatus 12 and executes the human exiting detection procedure 142. If the control apparatus 14 detects that all people exit the indoor space Z1, the control apparatus 14 enters the human entering detection mode S1. If the control apparatus 14 detects that the indoor apparatus 12 is turned on (it is assumed that the control apparatus 14 actively turns on the indoor apparatus 12 when at least one person enters the indoor space), the control apparatus 14 enters the second human exiting detection mode S3; otherwise the operation mode is not switched (changed).

In the second human exiting detection mode S3, the indoor apparatus 12 is turned on and at least one person enters the indoor space Z1. The control apparatus 14 continuously detects the state of the indoor apparatus 12 and executes the human exiting detection procedure 142. If the control apparatus 14 detects that all people exit the indoor space Z1, the control apparatus 14 enters the human entering detection mode S1. If the control apparatus 14 detects that the indoor apparatus 12 is turned off, for example, the indoor apparatus 12 is manually turned off by the person, the control apparatus 14 enters the first human exiting detection mode S2; otherwise the operation mode is not switched (changed).

In other words, the control apparatus 14 includes a first detection mode (namely, the human entering detection mode S1), a second detection mode (namely, the first human exiting detection mode S2), and a third detection mode (namely, the second human exiting detection mode S3). In particular, the control apparatus 14 can execute the human entering detection procedure 140 to detect whether at least one person enters the indoor space Z1 under the first detection mode. In addition, the control apparatus 14 can execute the human exiting detection procedure 142 to detect whether all people exit the indoor space Z1 under the second detection mode and the third detection mode.

Reference is made to FIG. 4 which is a state diagram of the detection mode according to a second embodiment of the present disclosure. FIG. 4 expresses switching the detection modes S1-S3 and a clearance mode S4 to each other by the control apparatus 14 or the microcontroller unit 204. For convenience, the control apparatus 14 is exemplified for further demonstration.

Because the operations of the human entering detection mode S1, the first human exiting detection mode S2, and the second human exiting detection mode S3 are almost identical to those in FIG. 3, the detail description is omitted here for conciseness. The major difference between the first embodiment in FIG. 3 and the second embodiment in FIG. 4 is that the latter further provides the clearance mode S4. If the control apparatus 14 detects that all people exit the indoor space Z1 under the second human exiting detection mode S3, the control apparatus 14 enters the clearance mode S4.

In the clearance mode S4, the indoor apparatus 12 is turned on and all people exit the indoor space Z1. The control apparatus 14 continuously detects the state of the indoor apparatus 12. If the control apparatus 14 detects that the indoor apparatus 12 is turned off (it is assumed that the control apparatus 14 actively turns off the indoor apparatus 12 when all people exit the indoor space), the control apparatus 14 enters the human entering detection mode S1; otherwise the operation mode is not switched (changed).

In other words, the control apparatus 14 further includes a fourth detection mode (namely, the clearance mode S4). Also, the control apparatus 14 can automatically turn off the indoor apparatus 12 and switch the fourth detection mode to the first detection mode.

Figure 5:
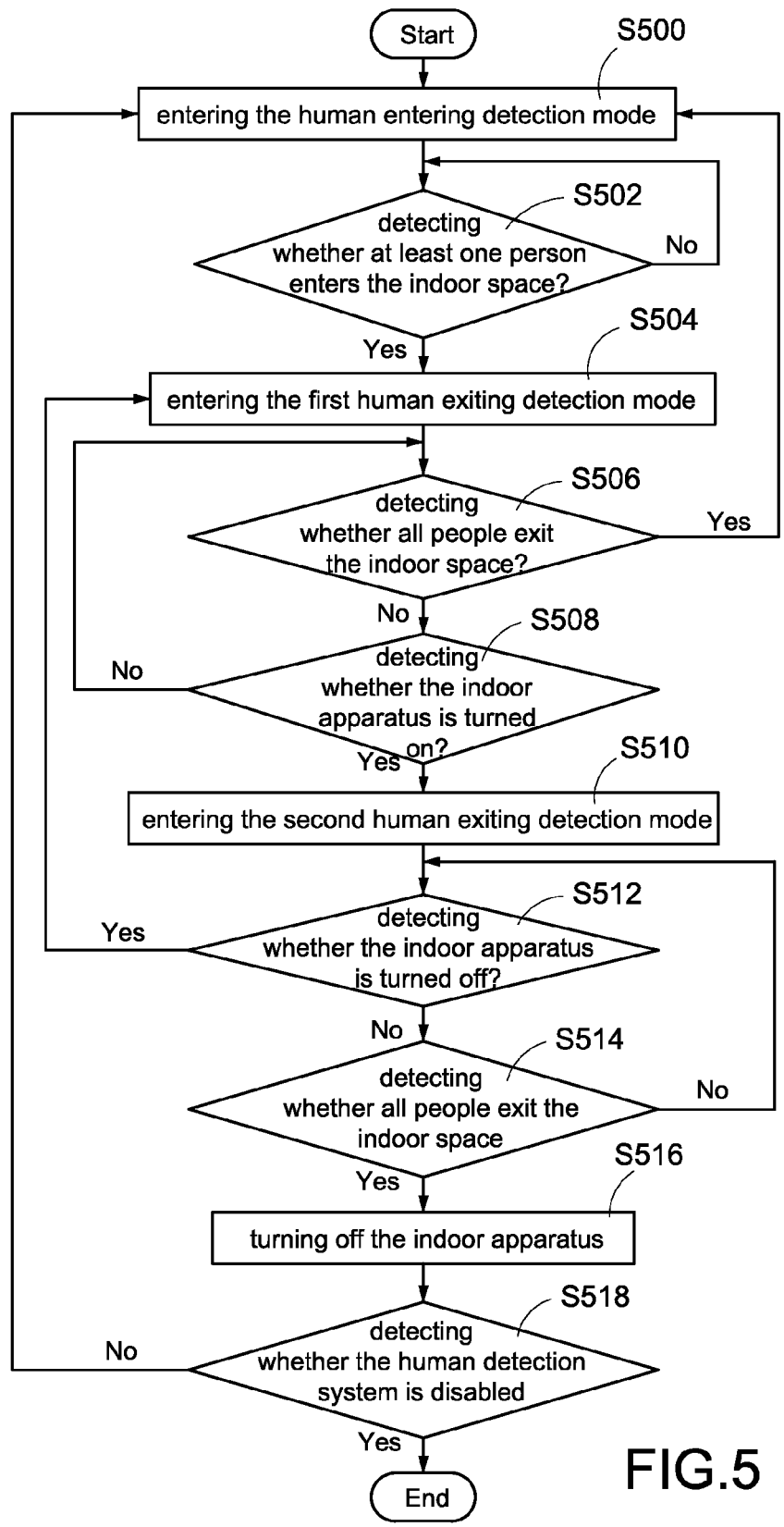
FIG. 5 is a flowchart of a human detection method according to a first embodiment of the present disclosure.

Reference is made to FIG. 5 which is a flowchart of a human detection method according to a first embodiment of the present disclosure. The human detection method is applied to the human detection system 1 shown in FIG. 1 or the human detection system shown in FIG. 2. However, the examples are for demonstration and not for limitation of the present disclosure. For convenience, the human detection system 1 is exemplified for further demonstration.

Step S500: entering the human entering detection mode S1. More specifically, the control apparatus 14 enters the human entering detection mode S1 when the indoor apparatus 12 is turned off and all people exit the indoor space Z1.

Step S502: detecting whether at least one person enters the indoor space Z1. More specifically, the control apparatus 14 executes the human entering detection procedure 140 to detect whether at least one person enters the indoor space Z1 according to the current thermal image acquired by the thermal sensor 10. If no any person enters the indoor space Z1, the S502 is repeatly executed. If at least one person enters the indoor space Z1, the following step (S504) is executed.

Step S504: entering the first human exiting detection mode S2. More specifically, the control apparatus 14 enters the first human exiting detection mode S2 when the indoor apparatus 12 is turned off and at least one person enters the indoor space Z1 (namely, the detection result in the S502).

Step S506: detecting whether all people exit the indoor space Z1. More specifically, after entering the first human exiting detection mode S2, the control apparatus 14 executes the human exiting detection procedure 142 to detect whether all people exit the indoor space Z1 according to the current thermal image acquired by the thermal sensor 10. If all people exit the indoor space Z1, the S500 is executed to enter the human entering detection mode S1. If no any person exits the indoor space Z1, the following step (S508) is executed.

Step S508: detecting whether the indoor apparatus 12 is turned on. More specifically, the control apparatus 14 detects whether the indoor apparatus 12 is turned on after entering the first human exiting detection mode S2. If the indoor apparatus 12 is not turned on, the S506 is repeatedly executed. If the indoor apparatus 12 is turned on, the following step (S510) is executed. In one embodiment, the control apparatus 14 can automatically turn on the indoor apparatus 12 when initially entering the first human exiting detection mode S2 that is from the human entering detection mode S1 to the first human exiting detection mode S2. In addition, the control apparatus 14 no longer automatically turns on the indoor apparatus 12 if the indoor apparatus 12 is manually turned off by the person so that the control apparatus 14 enters the first human exiting detection mode S2 that is from the second human exiting detection mode S3 to the first human exiting detection mode S2.

Step S510: entering the second human exiting detection mode S3. More specifically, the control apparatus 14 enters the second human exiting detection mode S3 when at least one person enters the indoor space Z1 (namely, the detection result in the S506) and the indoor apparatus 12 is turned on (namely, the detection result in the S508).

Step S512: detecting whether the indoor apparatus 12 is turned off. More specifically, the control apparatus 14 continuously detects whether the indoor apparatus 12 is turned off when entering the second human exiting detection mode S3. If the indoor apparatus 12 is turned off, the S504 is executed to enter the first human exiting detection mode S2. If the indoor apparatus 12 is not turned off, the following step (S514) is executed. In this embodiment, the S512 is provided to detect whether the indoor apparatus 12 is manually turned off. However, this example is for demonstration and not for limitation of the present disclosure.

Step S514: detecting whether all people exit the indoor space Z1. More specifically, the control apparatus 14 executes the human exiting detection procedure 142 to detect whether all people exit the indoor space Z1 according to the current thermal image acquired by the thermal sensor 10 when entering the second human exiting detection mode S3. The following step (S516) is executed if all people exit the indoor space Z1; otherwise the S512 is repeatly executed.

Step S516: turning off the indoor apparatus 12. More specifically, the control apparatus 14 turns off the indoor apparatus 12 and executes the following step (S518) when detecting that all people exit the indoor space Z1.

Step S518: detecting whether the human detection system 1 is disabled. More specifically, if the control apparatus 104 judges that the human detection system is not disabled, the S500 is repeatly executed. If the control apparatus 104 judges that the human detection system is disabled (such as the person manually disables the human detection system), the human detection method is ended.

Figure 6:
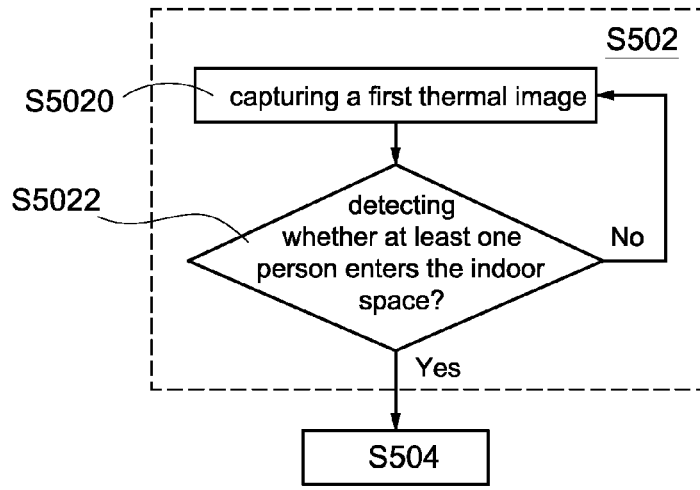
FIG. 6 is a detailed flowchart of the step (S502) in FIG. 5.

Reference is made to FIG. 6 which is a detailed flowchart of the S502 in FIG. 5 for expressing executing the human entering detection procedure 140 by the control apparatus 14.

Step S5020: capturing a first thermal image. More specifically, the thermal sensor 10 captures the first thermal image of the indoor space Z1 and transmits the first thermal image to the control apparatus 14.

Step S5022: detecting whether at least one person enters the indoor space Z1. More specifically, the control apparatus 14 executes an image processing to the first thermal image to analyze the complexity of the first thermal image. If the complexity of the first thermal image is excessively higher than a predetermined complexity value, the control apparatus 14 judges that at least one person enters the indoor space Z1 and executes the S504; otherwise the S5020 is repeatly executed.

Especially, the complexity of the thermal image expresses the degree of the heat distribution or the degree of the heat gradient of the thermal image. If the person exits the indoor space Z1, the heat distribution of the thermal image is smoother or the heat gradient of the thermal image is larger (such as the residual heat left on a chair quickly dissipates). If the person enters the indoor space Z1, the heat distribution of the thermal image is more complex (such as the volume of energy generated from the human body is greater compared to that of the electronic device) or the heat gradient of the thermal image is smaller (such as the normal human body temperature is almost constant).

Preferably, the complexity of the thermal image can be numeralized by an image frequency conversion or mathematical statistics. For example, the Fourier Transform or the Wavelet Transform can be used to process the thermal image to acquire the signal at particular frequency bands of the thermal image. Accordingly, the complexity of the thermal image can be analyzed according to the proportion of the signal at particular frequency bands of the thermal image.

In addition, a numerical statistics of the pixels of the thermal image can be used to acquire a statistical value, such as a variance to be the complexity of the thermal image. Preferably, the control apparatus can analyze the complexity of the thermal image according to the variation degree of the sensed temperature with time of pixels of the thermal image or the variation degree of the sensed temperature distribution of the whole thermal image.

Figure 7:
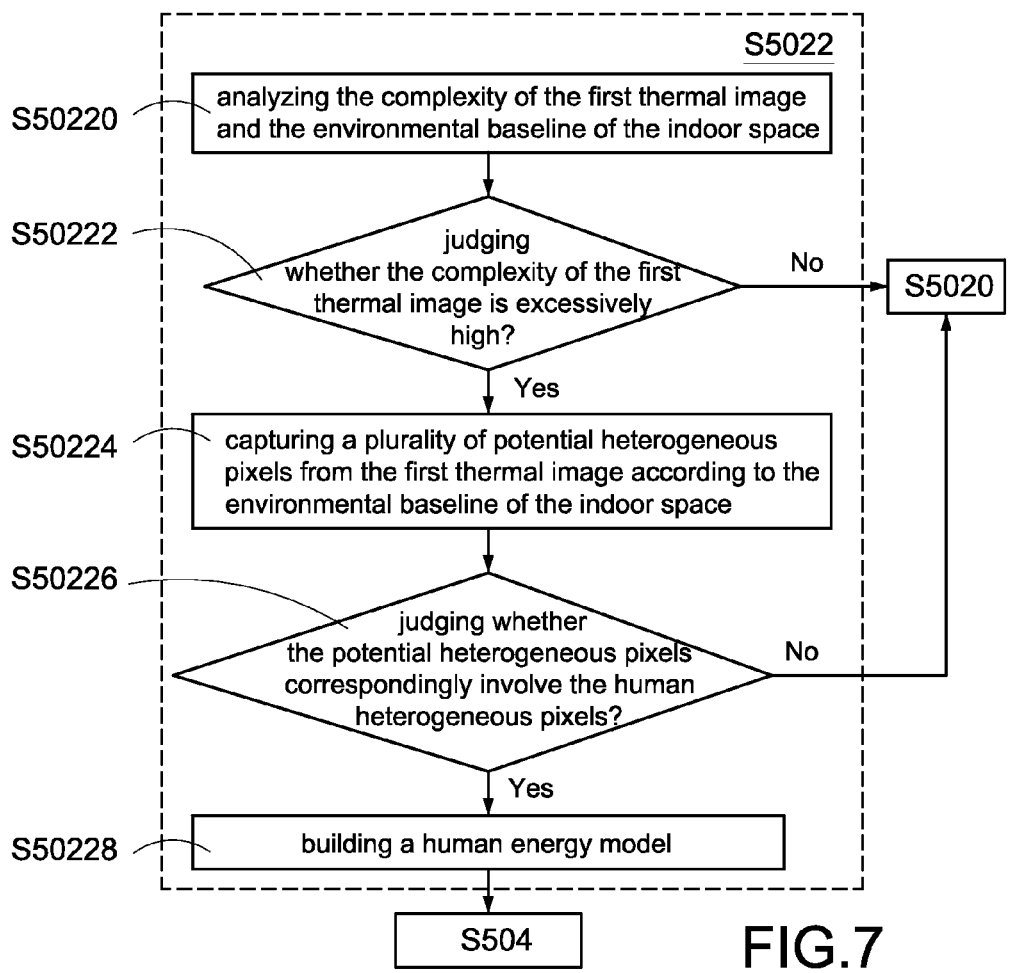
FIG. 7 is a detailed flowchart of the step (S5022) in FIG. 6.

Reference is made to FIG. 7 which is a detailed flowchart of the S5022 in FIG. 6 for further expressing executing the human entering detection procedure 140 by the control apparatus 14.

Step S50220: analyzing the complexity of the first thermal image and the environmental baseline of the indoor space Z1. More specifically, the control apparatus 14 analyzes not only the complexity of the first thermal image but also the environmental baseline of the indoor space Z1.

Especially, the environmental baseline of the indoor space Z1 expresses the heat distribution or the heat gradient of the indoor space Z1 in which no one stays. The control apparatus 14 can calculate and analyze the environmental baseline of the indoor space Z1 according to the sensed temperature with time of the first thermal image or the variation degree of the sensed temperature distribution of the whole thermal image. Preferably, the environmental baseline is composed of a plurality of temperature values which are the sensed temperature values of the indoor space Z1 in which no one stays, and the temperature values are corresponding to the pixels of the first thermal image. Accordingly, the sensed temperature value of each pixel of the first thermal image can be acquired by analyzing the environmental baseline.

Step S50222: judging whether the complexity of the first thermal image is excessively high. More specifically, the control apparatus 14 judges whether the complexity of the first thermal image is excessive high according to the analyzed complexity of the first thermal image in the S50220. For example, it is to judge whether the proportion of the signal at particular frequency bands of the thermal image is greater than a predetermined standard value or the variance is greater than a predetermined value. If the control apparatus 14 judges that the complexity of the first thermal image is not excessively high, the S5020 is repeated executed. If the control apparatus 14 judges that the complexity of the first thermal image is excessively high, the following step (S50224) is executed.

Step S50224: capturing a plurality of potential heterogeneous pixels from the first thermal image according to the environmental baseline of the indoor space Z1. More specifically, the control apparatus 14 compares the first thermal image with the environmental baseline acquired in the S50220 to take out the distinguished pixels whose temperature are different from that of the environmental baseline to be the potential heterogeneous pixels.

Step S50226: judging whether the potential heterogeneous pixels correspondingly involve the human heterogeneous pixels. More specifically, the control apparatus 14 executes a hot object processing to the potential heterogeneous pixels generated in the S50224. The hot object processing is provided to judge whether the potential heterogeneous pixels correspondingly involve the heterogeneous pixels of the person.

For example, the hot object processing can judge whether the potential heterogeneous pixels meet the characteristic of the human heat source according to the temperature according to the pixel values of the potential heterogeneous pixels or the number of the adjacent potential heterogeneous pixels so as to analyze the heat source corresponding to potential heterogeneous pixels is the human heat source or the non-human heat source, such as a heat source generated from the projector or the computer. If the potential heterogeneous pixels meet the characteristic of the human heat source, it is to judge that the potential heterogeneous pixels involve the heterogeneous pixels corresponding to the person.

If the potential heterogeneous pixels correspondingly involve the heterogeneous pixels, the control apparatus 14 judges that at least one person enters the indoor space Z1 and the following step (S50228) is executed; otherwise the S5020 is executed.

Step S50228: building a human energy model. More specifically, the control apparatus 14 captures the heterogeneous pixels from the potential heterogeneous pixels, builds the human energy model according to the heterogeneous pixels, and compares to a thermal image of the human exiting detection. Preferably, the control apparatus 14 build the human energy model according to the sensed temperature, the number of the heterogeneous pixels, and the location which the heterogeneous pixels in the first thermal image so that the human energy model can be expressed as the sensed temperature (corresponding to the sensed temperature of the heterogeneous pixels) and volume of the person (corresponding to the number of the heterogeneous pixels) and the location of the person in the indoor space Z1 (corresponding to the location which the heterogeneous pixels in the first thermal image).

Especially, the human energy model is expressed as the heat distribution or heat gradient of the person entering the indoor space Z1. In particular, the human energy model can be a three-dimensional thermal model or a two-dimensional thermal image. However, these examples are for demonstration and not for limitation of the present disclosure.

Figure 8:
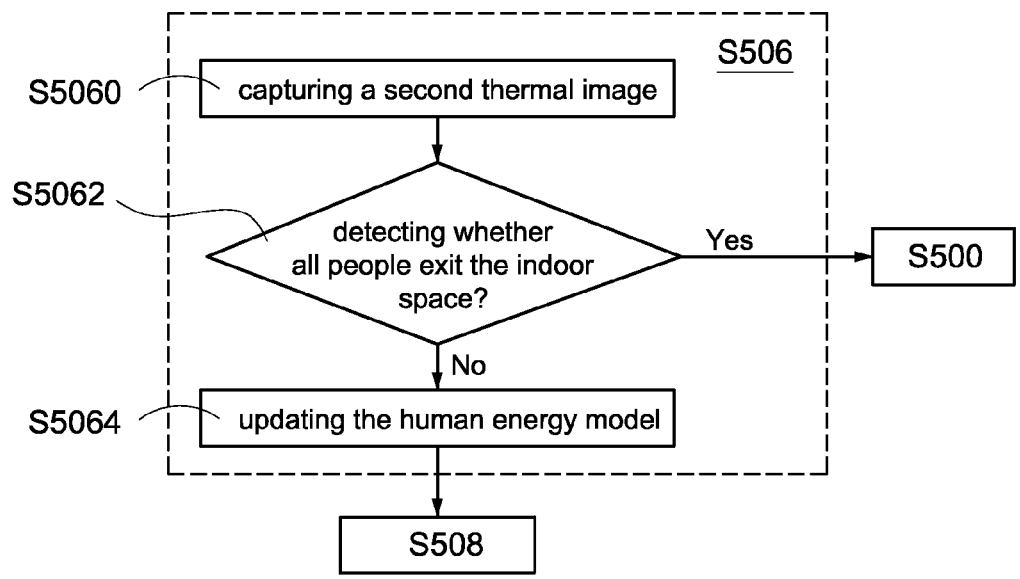
FIG. 8 is a detailed flowchart of the step (S506) in FIG. 5.

Reference is made to FIG. 8 which is a detailed flowchart of the S506 in FIG. 5 for expressing executing the human exiting detection procedure 142 by the control apparatus 14 under the first human exiting detection mode.

Step S5060: capturing a second thermal image.

Step S5062: detecting whether all people exit the indoor space Z1. More specifically, the control apparatus 14 judges whether all people exit the indoor space Z1 according to the complexity of the second thermal image and the human energy model. If the complexity of the second thermal image is excessively high and the second thermal image involves the human energy model, the control apparatus 14 judges that all people do not exit the indoor space Z1 and the following step (S5064) is executed; otherwise the S500 is repeatly executed.

Step S5064: updating the human energy model. More specifically, the control apparatus 14 judges whether another person enters the indoor space Z1 or any one exits the indoor space Z1 according the current second thermal image, and updates the human energy model. After the S5064 is finished, the S508 is executed.

Figure 9:
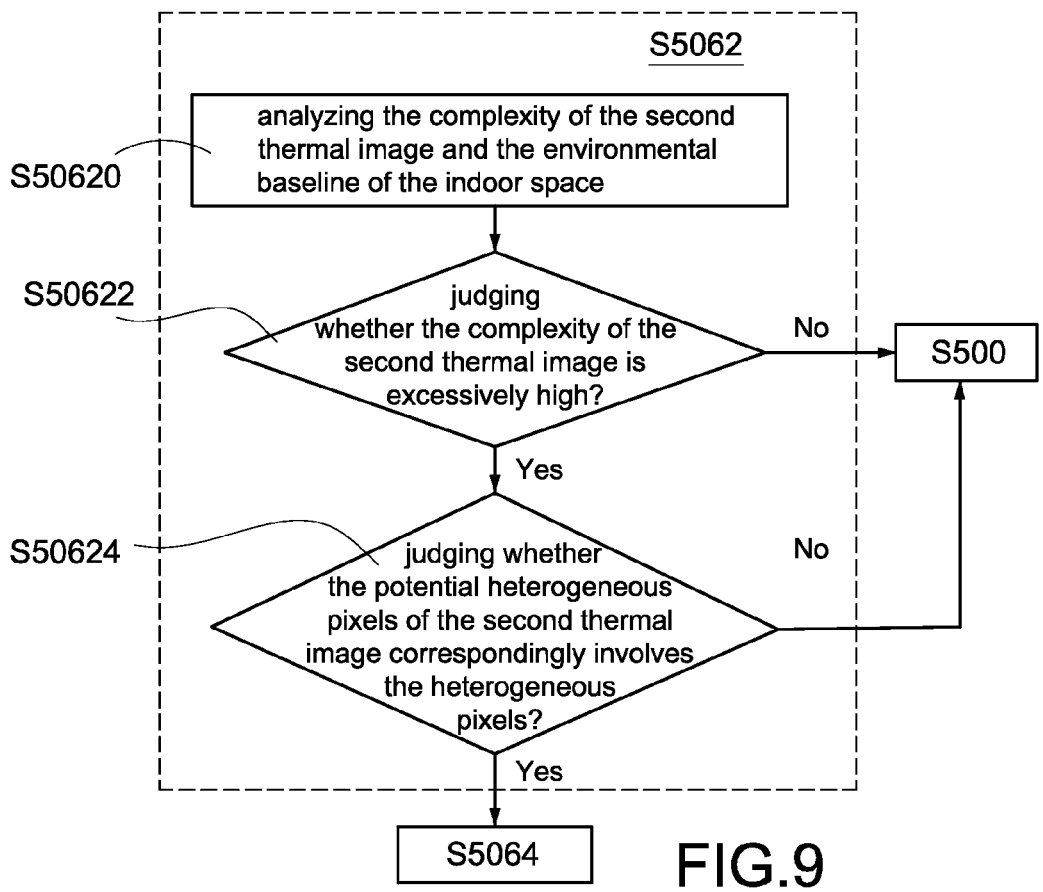
FIG. 9 is a detailed flowchart of the step (S5062) in FIG. 8.

Reference is made to FIG. 9 which is a detailed flowchart of the S5062 in FIG. 8 for further expressing executing the human exiting detection procedure 142 by the control apparatus 14.

Step S50620: analyzing the complexity of the second thermal image and the environmental baseline of the indoor space Z1.

Step S50622: judging whether the complexity of the second thermal image is excessively high. More specifically, if the complexity of the second thermal image is not excessively high, the control apparatus 14 judges that all people exit the indoor space Z1 and the S500 is repeatly executed. If the control apparatus 14 judges that the complexity of the second thermal image is excessively high, the following step (S50624) is executed.

Step S50624: judging whether the potential heterogeneous pixels of the second thermal image correspondingly involves the heterogeneous pixels of the human energy model. More specifically, the control apparatus 14 compares the pixels of the second thermal image with the environmental baseline to capture the potential heterogeneous pixels, and compares the potential heterogeneous pixels with the heterogeneous pixels of the human energy model so as to judge whether the potential heterogeneous pixels of the second thermal image involves the pixels which are identical to or like to the heterogeneous pixels.

If the potential heterogeneous pixels of the second thermal image do not involve the heterogeneous pixels of the human energy model, the control apparatus 14 judges that all people exit the indoor space Z1 and the S5064 is executed.

Figure 10:
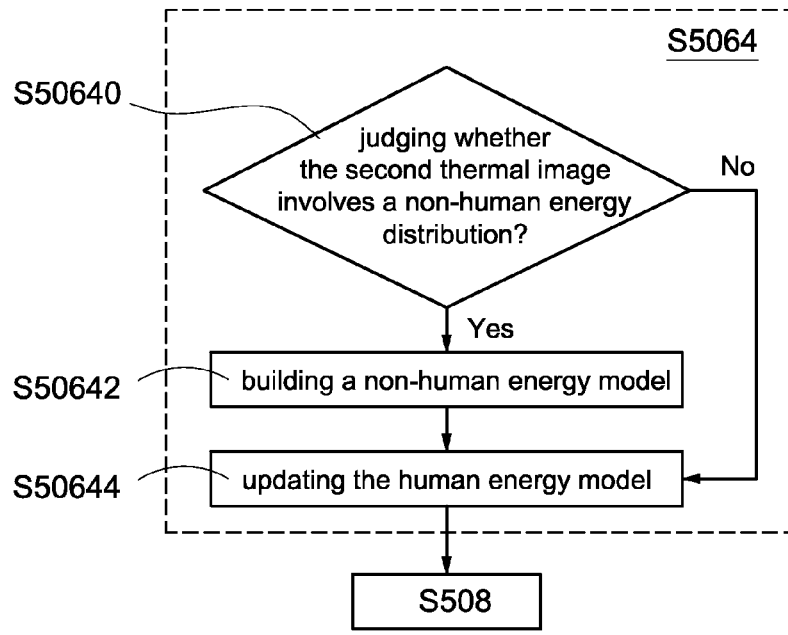
FIG. 10 is a detailed flowchart of the step (S5064) in FIG. 8.

Reference is made to FIG. 10 which is a detailed flowchart of the S5064 in FIG. 8 for further expressing executing the human exiting detection procedure 142 by the control apparatus 14.

Step S50640: judging whether the second thermal image involves a non-human energy distribution. More specifically, the control apparatus 14 judges whether the second thermal image involves a non-human heat source. If the control apparatus 14 judges that the second thermal image involves the non-human energy distribution, the following step (S50642) is executed; otherwise the following step (S50644) is executed.

Step S50642: building a non-human energy model. More specifically, the control apparatus 14 builds the non-human energy model according to the non-human heat source to judge whether the heat source is generated by the person in the indoor space Z1.

Step S50644: updating the human energy model. After the S50644 is finished, the S508 is executed.

Figure 11:
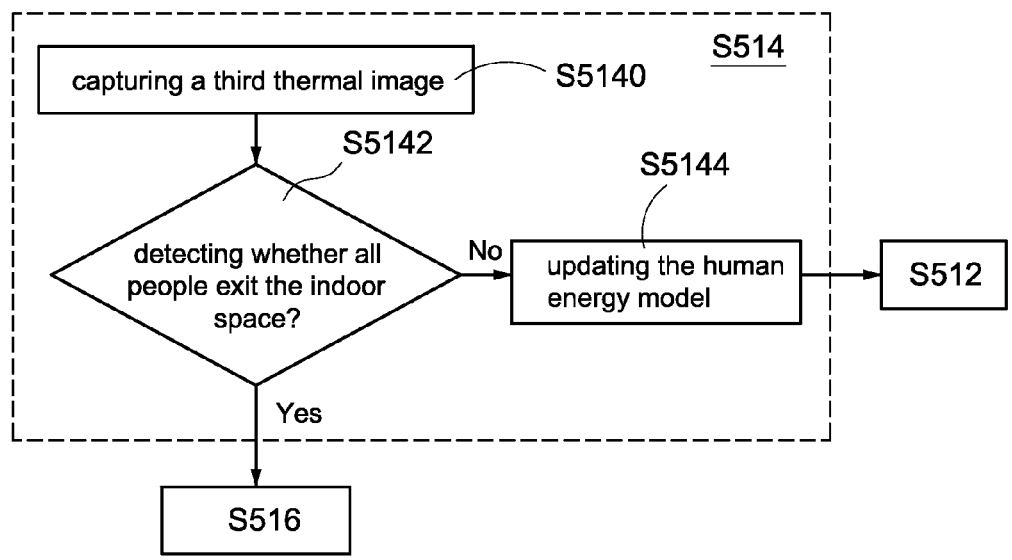
FIG. 11 is a detailed flowchart of the step (S514) in FIG. 5.

Reference is made to FIG. 11 which is a detailed flowchart of the S514 in FIG. 5 for expressing executing the human exiting detection procedure 142 by the control apparatus 14 under the second human exiting detection mode.

Step S5140: capturing a third thermal image.

Step S5142: detecting whether all people exit the indoor space Z1. More specifically, the control apparatus 14 judges whether all people exit the indoor space Z1 according to the complexity of the third thermal image and the human energy model. If the complexity of the third thermal image is excessively high and the third thermal image involves the human energy model, the control apparatus 14 judges that all people do not exit the indoor space Z1 and the following step (S5144) is executed; otherwise the S516 is repeatly executed.

Step S5144: updating the human energy model. More specifically, the control apparatus 14 updates the human energy model according to the third thermal image. After the S5144 is finished, the S512 is executed.

Figure 12:
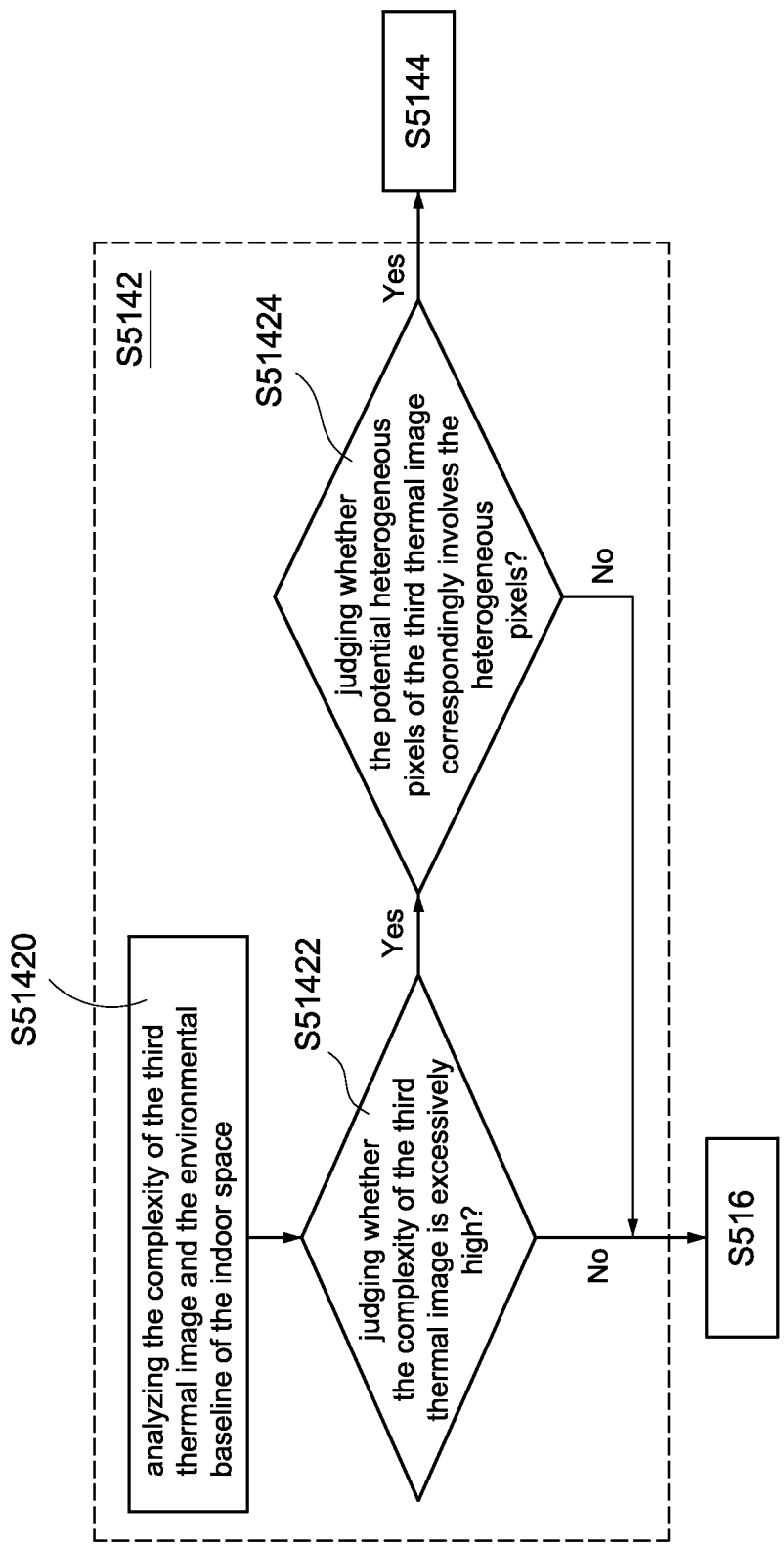
FIG. 12 is a detailed flowchart of the step (S5142) in FIG. 11.

Reference is made to FIG. 12 which is a detailed flowchart of the S5142 in FIG. 11 for further expressing executing the human exiting detection procedure 142 by the control apparatus 14.

Step S51420: analyzing the complexity of the third thermal image and the environmental baseline of the indoor space Z1.

Step S51422: judging whether the complexity of the third thermal image is excessively high. More specifically, if the complexity of the third thermal image is not excessively high, the control apparatus 14 judges that all people exit the indoor space Z1 and the S516 is repeatly executed. If the control apparatus 14 judges that the complexity of the third thermal image is excessively high, the following step (S51424) is executed.

Step S51424: judging whether the potential heterogeneous pixels of the third thermal image correspondingly involves the heterogeneous pixels of the human energy model. More specifically, the control apparatus 14 compares the pixels of the third thermal image with the environmental baseline to capture the potential heterogeneous pixels, and compares the potential heterogeneous pixels with the heterogeneous pixels of the human energy model so as to judge whether the potential heterogeneous pixels of the third thermal image involves pixels which are identical to or like to the heterogeneous pixels.

If the potential heterogeneous pixels of the third thermal image do not involve the heterogeneous pixels of the human energy model, the control apparatus 14 judges that all people exit the indoor space Z1 and the S516 is executed. If the potential heterogeneous pixels of the third thermal image involve the heterogeneous pixels of the human energy model, the control apparatus 14 judges that at least one person still stays in the indoor space Z1 and the S5144 is executed.

Figure 13:
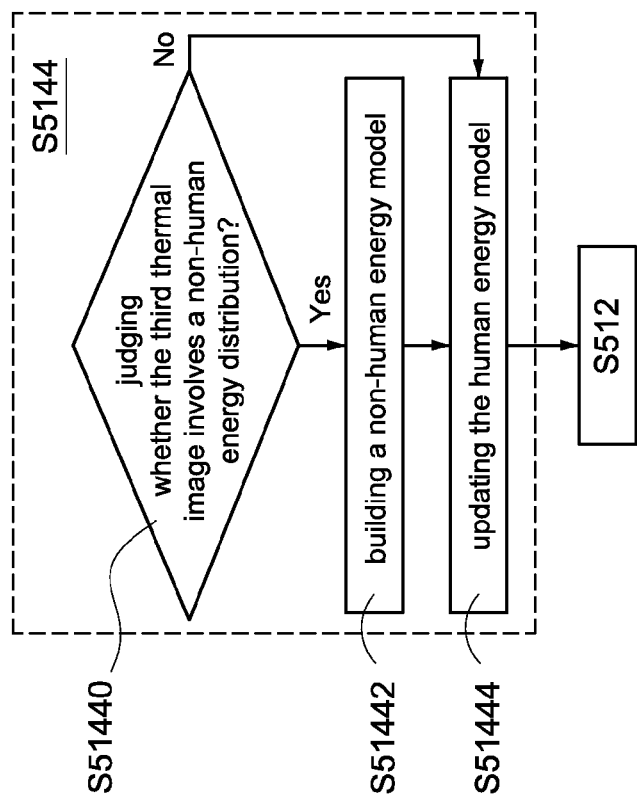
FIG. 13 is a detailed flowchart of the step (S5144) in FIG. 11.

Reference is made to FIG. 13 which is a detailed flowchart of the S5144 in FIG. 11 for further expressing executing the human exiting detection procedure 142 by the control apparatus 14.

Step S51440: judging whether the third thermal image involves a non-human energy distribution. More specifically, if the control apparatus 14 judges that the third thermal image involves the non-human energy distribution, the following step (S51442) is executed; otherwise the following step (S51444) is executed.

Step S51442: building a non-human energy model.

Step S51444: updating the human energy model.

Figure 14:
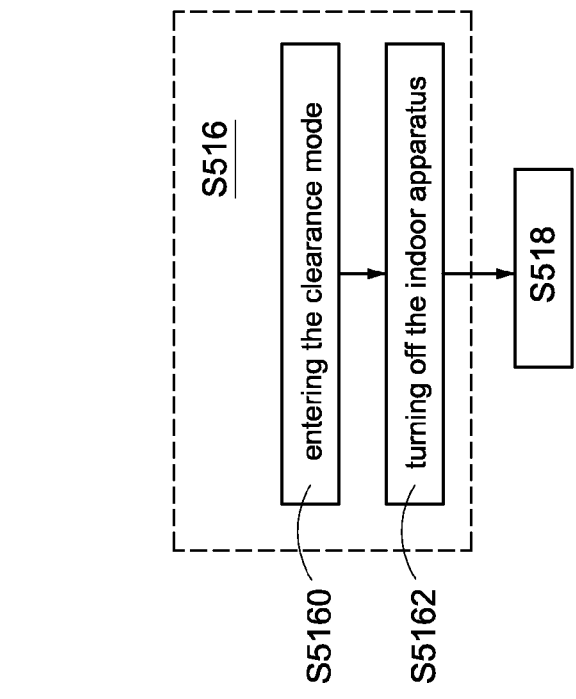
FIG. 14 is a detailed flowchart of the step (S516) in FIG. 5.

Reference is made to FIG. 14 which is a detailed flowchart of the S516 in FIG. 5.

Step S5160: entering the clearance mode S4.

Step S5162: turning off the indoor apparatus 12. More specifically, the control apparatus 14 actively turns off the indoor apparatus 12 and executes the S518 after entering the clearance mode S4.

The efficacy of the present disclosure is to avoid misjudgment of human exiting the indoor space when the person does not move to exit the indoor space.

In addition, the second detection mode (the indoor apparatus is turned off) and the third detection mode (the indoor apparatus is turned on) are switched according to the states of the indoor apparatus to avoid causing the uncoordinated conditions between the detection system and the user after the user manually turns on or turns off the indoor apparatus.

In addition, different detection procedures are used to separately detect the human entering condition and the human exiting condition so as to effectively reduce misjudgment rates of the human entering/exiting behavior.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A human detection system applied to an indoor space, comprising:
    a thermal sensor configured to continuously capture a thermal image of the indoor space; an indoor apparatus; and
    a control apparatus connected to the thermal sensor and the indoor apparatus; the control apparatus is configured to enter a first detection mode and execute a human entering detection procedure when the indoor apparatus is turned off and all people exit the indoor space; the control apparatus is configured to enter a second detection mode and execute a human exiting detection procedure when the indoor apparatus is turned off and at least one person enters the indoor space; the control apparatus is configured to enter a third detection mode and execute the human exiting detection procedure when the indoor apparatus is turned on and at least one person enters the indoor space;
    wherein the control apparatus is configured to detect whether at least one person enters the indoor space according to the thermal image under the human entering detection procedure and detect whether all people exit the indoor space according to the thermal image under the human exiting detection procedure.

2. The human detection system in claim 1, further comprising:
    a human machine interface connected to the control apparatus, and being operated to control the indoor apparatus.

3. The human detection system in claim 1, wherein the control apparatus is configured to judge whether at least one person enters the indoor space according to the complexity of the thermal image in the human entering detection procedure; the control apparatus is configured to execute a human energy model building procedure to build a human energy model according to the thermal image when detecting that at least one person enters the indoor space.

4. The human detection system in claim 3, wherein the control apparatus is configured to compare the thermal image with the human energy model to judge whether all people exit the indoor space in the human exiting detection procedure; the control apparatus is configured to execute a human energy model updating procedure to update the human energy model according to the thermal image when detecting that no any person exits the indoor space.

5. A human detection system applied to an indoor space, comprising:
   an indoor apparatus;
   a control apparatus connected to the indoor apparatus; the control apparatus is configured to control the indoor apparatus according to a control signal and transmit a state signal of the indoor apparatus; and
   a human detector connected to the control apparatus, comprising:
      a thermal sensor configured to continuously capture a thermal image of the indoor space;
      a transmission unit configured to transmit the control signal to the control apparatus and receive the state signal from the control apparatus; wherein the state signal comprises an operation state of the indoor apparatus; and
      a microcontroller unit connected to the thermal sensor and the transmission unit; the microcontroller unit is configured to enter a first detection mode and execute a human entering detection procedure when the indoor apparatus is turned off and all people exit the indoor space; the microcontroller unit is configured to enter a second detection mode and execute a human exiting detection procedure when the indoor apparatus is turned off and at least one person enters the indoor space; the microcontroller unit is configured to enter a third detection mode and execute the human exiting detection procedure when the indoor apparatus is turned on and at least one person enters the indoor space;
   wherein the microcontroller unit is configured to detect whether at least one person enters the indoor space and correspondingly generate the control signal according to the thermal image under the human entering detection procedure and detect whether all people exit the indoor space and correspondingly generate the control signal according to the thermal image under the human exiting detection procedure.

6. The human detection system in claim 5, further comprising:
   a human machine interface connected to the control apparatus, and being operated to control the indoor apparatus.

7. The human detection system in claim 5, wherein the microcontroller unit is configured to actively transmit the control signal to the control apparatus through the transmission unit to turn on the indoor apparatus after entering from the first detection mode to the second detection mode, and the microcontroller unit is configured to actively enter the third detection mode after the indoor apparatus is turned on.

8. The human detection system in claim 5, wherein the microcontroller unit is configured to enter a fourth detection mode when the indoor apparatus is turned on and all people exit the indoor space; and actively transmit the control signal to the control apparatus through the transmission unit to turn off the indoor apparatus after entering the fourth detection mode; and actively enter the first detection mode when the indoor apparatus is turned off.

9. The human detection system in claim 5, wherein the control apparatus is configured to judge whether at least one person enters the indoor space according to the complexity of the thermal image in the human entering detection procedure; the control apparatus is configured to execute a human energy model building procedure to build a human energy model according to the thermal image when detecting that at least one person enters the indoor space.

10. The human detection system in claim 9, wherein the control apparatus is configured to compare the thermal image with the human energy model to judge whether all people exit the indoor space in the human exiting detection procedure; the control apparatus is configured to execute a human energy model updating procedure to update the human energy model according to the thermal image when detecting that no any person exits the indoor space.

11. A human detection method applied to a human detection system; the human detection system comprising a thermal sensor, a control apparatus, and an indoor apparatus, the thermal sensor configured to continuously capture a thermal image of an indoor space; the method comprising:
   (a) entering a first detection mode to detect whether at least one person enters the indoor space according to the thermal image;
   (b) detecting whether the indoor apparatus is turned on when at least one person enters the indoor space and entering a second detection mode, and detecting whether all people exit the indoor space according to the thermal image;
   (c) executing the step (a) when all people exit the indoor space in the step (b);
   (d) entering a third detection mode to detect whether the indoor apparatus is turned off and detect whether all people exit the indoor space according to thermal image when detecting that the indoor apparatus is turned on in the step (b);
   (e) executing the step (b) when the indoor apparatus is turned off in the step (d);
   (f) turning off the indoor apparatus when all people exit the indoor space in the step (d); and
   (g) judging whether the human detection system is disabled in the step (f), and executing the step (a) when the human detection system is not disabled.

12. The human detection method in claim 11, wherein the step (a) comprises:
   (a1) entering the first detection mode;
   (a2) capturing a first thermal image; and
   (a3) judging whether at least one person enters the indoor space according to the complexity of the first thermal image.

13. The human detection method in claim 12, wherein the step (b) comprises:
   (b1) building a human energy model according to the first thermal image when at least one person enters the indoor space;
   (b2) entering the second detection mode;
   (b3) judging whether the indoor apparatus is turned on;
   (b4) capturing a second thermal image when the indoor apparatus is not turned on;
   (b5) judging whether all people exit the indoor space according to the second thermal image and the human energy model; and (b6) updating the human energy model according to the second thermal image when no any person exits the indoor space.

14. The human detection method in claim 13, wherein the step (d) comprises:
(d1) entering the third detection mode when the indoor apparatus is turned on;
(d2) judging whether the indoor apparatus is turned off;
(d3) capturing a third thermal image when the indoor apparatus is not turned off;
(d4) judging whether all people exit the indoor space according to the third thermal image and the human energy model; and
(d5) updating the human energy model according to the third thermal image when no any person exits the indoor space.

15. The human detection method in claim 14, wherein the step (a3) comprises:
(a31) analyzing the complexity of the first thermal image and an environmental baseline of the indoor space;
(a32) capturing a plurality of potential heterogeneous pixels of the first thermal image according to the environmental baseline when the complexity of the first thermal image is excessively high; and
(a33) executing a hot object processing to the potential heterogeneous pixels to judge whether the potential heterogeneous pixels correspondingly involve the heterogeneous pixels of the person.

16. The human detection method in claim 15, wherein the human energy model is built according to the heterogeneous pixels of the first thermal image in the step (b1).

17. The human detection method in claim 15, wherein the complexity of the first thermal image and the environmental baseline of the indoor space are analyzed according to the variation degree of the sensed temperature with time of the pixels of the thermal image in the step (a31).

18. The human detection method in claim 15, wherein the complexity of the first thermal image and the environmental baseline of the indoor space are analyzed according to the variation degree of the sensed temperature distribution of the whole first thermal image in the step (a31).

19. The human detection method in claim 16, wherein the step (b5) comprises:

(b51) analyzing the complexity of the second thermal image and the environmental baseline of the indoor space;
(b52) capturing a plurality of potential heterogeneous pixels of the second thermal image according to the environmental baseline when the complexity of the second thermal image is excessively high; and
(b53) judging whether the potential heterogeneous pixels of the second thermal image correspondingly involves the heterogeneous pixels of the human energy model.

20. The human detection method in claim 19, wherein the step (b6) comprises:
(b61) updating the human energy model according to the heterogeneous pixels of the second thermal image when the potential heterogeneous pixels involve the heterogeneous pixels of the human energy model; and
(b62) building a non-human energy model when the second thermal image involves a non-human energy distribution.

21. The human detection method in claim 20, wherein the step (d4) comprises:
(d41) analyzing the complexity of the third thermal image and the environmental baseline of the indoor space;
(d42) capturing a plurality of potential heterogeneous pixels of the third thermal image according to the environmental baseline when the complexity of the third thermal image is excessively high; and
(b53) judging whether the potential heterogeneous pixels of the third thermal image correspondingly involves the heterogeneous pixels of the human energy model.

22. The human detection method in claim 21, wherein the step (d5) comprises:
(d51) updating the human energy model according to the heterogeneous pixels of the third thermal image when the potential heterogeneous pixels of the third thermal image involve the heterogeneous pixels of the human energy model; and
(d52) building a non-human energy model when the third thermal image involves a non-human energy distribution.

* * * * *